United States Patent
Miyamoto et al.

(10) Patent No.: US 7,143,086 B2
(45) Date of Patent: Nov. 28, 2006

(54) FILE SEARCH METHOD AND APPARATUS, AND INDEX FILE CREATION METHOD AND DEVICE

(75) Inventors: Kenichiro Miyamoto, Oita (JP); Yumiko Kitagawa, Oita (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/301,635

(22) Filed: Nov. 22, 2002

(65) Prior Publication Data

US 2003/0101171 A1    May 29, 2003

(30) Foreign Application Priority Data

Nov. 26, 2001    (JP)    ............... 2001-359788

(51) Int. Cl.
*G06F 17/30*    (2006.01)
*G06F 15/16*    (2006.01)

(52) U.S. Cl. ............... 707/3; 707/4; 707/100; 709/228

(58) Field of Classification Search ............ 707/3, 707/100, 103 R
See application file for complete search history.

(56) References Cited

U.S. PATENT DOCUMENTS

| | | | | |
|---|---|---|---|---|
| 5,257,365 A | * | 10/1993 | Powers et al. | ............... 707/100 |
| 5,664,184 A | * | 9/1997 | Ferguson et al. | ....... 707/103 R |
| 5,752,243 A | * | 5/1998 | Reiter et al. | ................... 707/3 |
| 2001/0007987 A1 | * | 7/2001 | Igata | ............... 707/3 |
| 2004/0024778 A1 | * | 2/2004 | Cheo | ................. 707/104.1 |

OTHER PUBLICATIONS

G.M. Famelis et al., "Triply Chained Tree: An Enhancement of Doubly Chained Tree", Angewandte Informatick. Applied Informatics, vol. 31, No. 1, 1989, pp. 19-25.
Alfonso F. Cardenas et al., "Doubly-Chained Tree Data Base Organisation Analysis and Design Strategies", The Computer Journal, vol. 20, No. 1, Feb. 1977, pp. 15-26.
F. Suraweera, "Use of Doubly Chained Tree Structures in File Organisation for Optimal Searching", Computer Journal, vol. 29, No. 1, Feb. 1, 1986, pp. 52-59.
E. H. Sussenguth, Jr., "Use of Tree Structures for Processing Files", Communications of the ACM, vol. 26, No. 2, Jan. 1983., pp. 17-20.

* cited by examiner

*Primary Examiner*—Jeffrey Gaffin
*Assistant Examiner*—Hassan Mahmoudi
(74) *Attorney, Agent, or Firm*—Staas & Halsey LLP (57) ABSTRACT

In order to search a file to be searched which includes records having fields allocated to each of a plurality of hierarchical levels and is constructed so that records having a same key character string in a field at a same hierarchical level are arranged in series, an index file is created by obtaining start position information and number information about records having a key character string contained in the hierarchical level of each node on the file to be searched, or a pointer to node management information of a lower hierarchical level, and by recording the information obtained for the nodes of all the hierarchical levels. Further, data is extracted from the file to be searched by using the record start position information, the record number information, and the pointer to the node management information of a lower hierarchical level recorded in the index file.

18 Claims, 10 Drawing Sheets

FIG. 8A DATA EXTRACTION BUSINESS FORM ON CONDITIONS OF PRODUCT MAIN CLASSIFICATION AND PRODUCT SUB-CLASSIFICATION

FIG. 8B DRILL-DOWN BUSINESS FORM FROM PRODUCT MAIN CLASSIFICATION TO PRODUCT SUB-CLASSIFICATION

FIG. 9

FILE SEARCH METHOD AND APPARATUS, AND INDEX FILE CREATION METHOD AND DEVICE

BACKGROUND OF THE PRESENT INVENTION

The present invention relates to a method and an apparatus for promptly searching for and extracting data from a file to be searched, such as a CSV file (Comma Separated Value File) with a large file size.

Outputting the searched data from a database as a CSV file is generally performed. Conventionally, when using the data as a CSV file, it has been general to handle a database with at most around several hundred KB.

Thus, conventionally, when using the data of the CSV file, since the result accumulated from the database beforehand is used as the content of the data, there is a premise that the size of the file should be around several KB.

However, in the case of a recent large DWH which handles a several-GB unit of data, the accumulated CSV file itself is a gigantic file of several hundred MB, and it takes a long time to search for and extract data.

BRIEF SUMMARY OF THE PRESENT INVENTION

An object of the present invention is to provide a file search method and apparatus, capable of extracting data efficiently at high speeds even when a file to be searched (CSV file) is of a large size of several hundred MB unit.

Another object of the present invention is to provide an index file creation method and device, for creating an index file for efficiently searching a file to be searched (CSV file).

Still another object of the present invention is to provide a computer program for realizing the file search apparatus or the index file creation device, and a memory produce storing this computer program.

A file search apparatus according to the first aspect of the present invention is designed for searching a file to be searched, the file to be searched including records having fields allocated to each of a plurality of hierarchical levels and being constructed so that records having the same key character string in a field at the same hierarchical level are arranged in series, and comprises: an index file containing management information for each of nodes in a tree structure obtained by classifying the records in the file to be searched by using a plurality of hierarchical levels, the management information including a title of a key character string contained in each node, and start position information and number information about records having a field with the key character string on the file to be searched; an input unit for giving an instruction to search for data relating to a specified key character string over the file to be searched; a retrieving unit for retrieving from the index file the start position information and the number information about records relating to the specified key character string on the file to be searched; an extracting unit for extracting from the file to be searched a number of records specified by the number information from a position specified by the start position information; and an output unit for outputting data of the extracted records.

A file search apparatus according to the second aspect of the present invention is designed for searching a file to be searched, the file to be searched including records having fields allocated to each of a plurality of hierarchical levels and being constructed so that records having the same key character string in a field at the same hierarchical level are arranged in series, and comprises: an index file containing management information for each of nodes in a tree structure obtained by classifying the records in the file to be searched by using a plurality of hierarchical levels, the management information including a title of a key character string contained in each node, start position information and number information about records having a field with the key character string on the file to be searched, and a pointer indicating a position of node management information of a lower hierarchical level provided for each key character string; an input unit for giving an instruction to search for data relating to a specified key character string over the file to be searched; a retrieving unit for retrieving, based on the pointer to the node management information of a lower hierarchical level relating to the specified key character string, a start position of a record of the node management information of the lower hierarchical level from the index file; an extracting unit for extracting data of the record in the file to be searched, based on the retrieved start position of record; and an output unit for outputting the extracted data.

An index file creation device of the present invention is designed for creating an index file for searching a file to be searched, the file to be searched including records having a key character string allocated to each of a plurality of hierarchical levels and being constructed so that records having the same key character string in a field at the same hierarchical level are arranged in series, the index file containing management information for each of nodes in a tree structure obtained by classifying the records in the file to be searched by using a plurality of hierarchical levels, the management information including a title of a key character string contained in each node, and start position information and number information about records having the key character string on the file to be searched, the device comprising: a hierarchical number recognizing unit for recognizing the number of hierarchical levels; and a node management information creating unit for executing, for nodes of all of the number of hierarchical levels recognized by the hierarchical number recognizing unit, a node management information creation process to create node management information which is provided for each node, the process including obtaining a position of a top record among records containing a key character string included in the hierarchical level of each node on the file to be searched, detecting the number of records having the same key character string as in the top record by reading records following the top record, and writing information about the top record position and information about the number of the records in the node management information.

In such an index file creation device, it is preferred that the node management information creation process further includes a process of writing in the node management information a pointer indicating a record position of the node management information of a lower hierarchical level.

The above and further objects and features of the present invention will more fully be apparent from the following detailed description with accompanying drawings.

DETAILED DESCRIPTION OF THE PRESENT INVENTION

The following description will describe the present invention in detail, based on the drawings illustrating an embodiment thereof.

(1) Overall Structure and Outline of Processes of the Embodiment

The overall structure and an outline of the processes of one embodiment of the present invention will be explained using a block diagram of FIG. 1 which shows the structure of this embodiment.

First, a CSV file 3 as a file to be searched is created by extracting data from a large-size database 1 ranging from several gigabytes to several terabytes by an extraction processing unit 2, based on a given condition. This CSV file 3 ranges from several hundred megabytes to several gigabytes. Note that since the creation of a CSV file by extracting data from a database is a known common technique, a detail explanation of the extraction processing unit 2 is omitted.

Next, in order to efficiently search for and extract data in the CSV file 3, an index file 5 is created by an index creation processing unit 4. In this index creation processing unit 4, the hierarchy of the CSV file 3 is recognized by a hierarchy recognition processing unit 41, and node management information that forms the index file 5 is created by a node management information creation processing unit 42.

With the use of this index file 5, a file search processing unit 6 searches for and extracts data from the CSV file 3, and outputs the obtained data. Therefore, when a request for a search is received by an input processing unit 61, data is extracted by an extraction processing unit 62, and an output result 7 is outputted by an output processing unit 63. It is desirable to make the extraction mode changeable as shown in later described FIGS. 8A and 8B by using a display for the output processing unit 63, and by further realizing the input processing unit 61 by making an indication with a pointing device (for example, an indication with a mouse cursor) on the display screen of the display. However, this does not mean to exclude an embodiment in which data is outputted as printed material.

Note that the extraction processing unit 2, the index creation processing unit 4 and the file search processing unit 6 may be realized by installing programs for performing the respective processes in separate hardware (processors, computers) respectively, and two or all of the processes may be realized by the same hardware (by installing the programs for executing the respective processes in the same hardware). Besides, the programs for causing the hardware to execute their processing functions (to function as a processing unit) can be installed by downloading the programs to the hardware from memory product or communication media.

Figure 1:
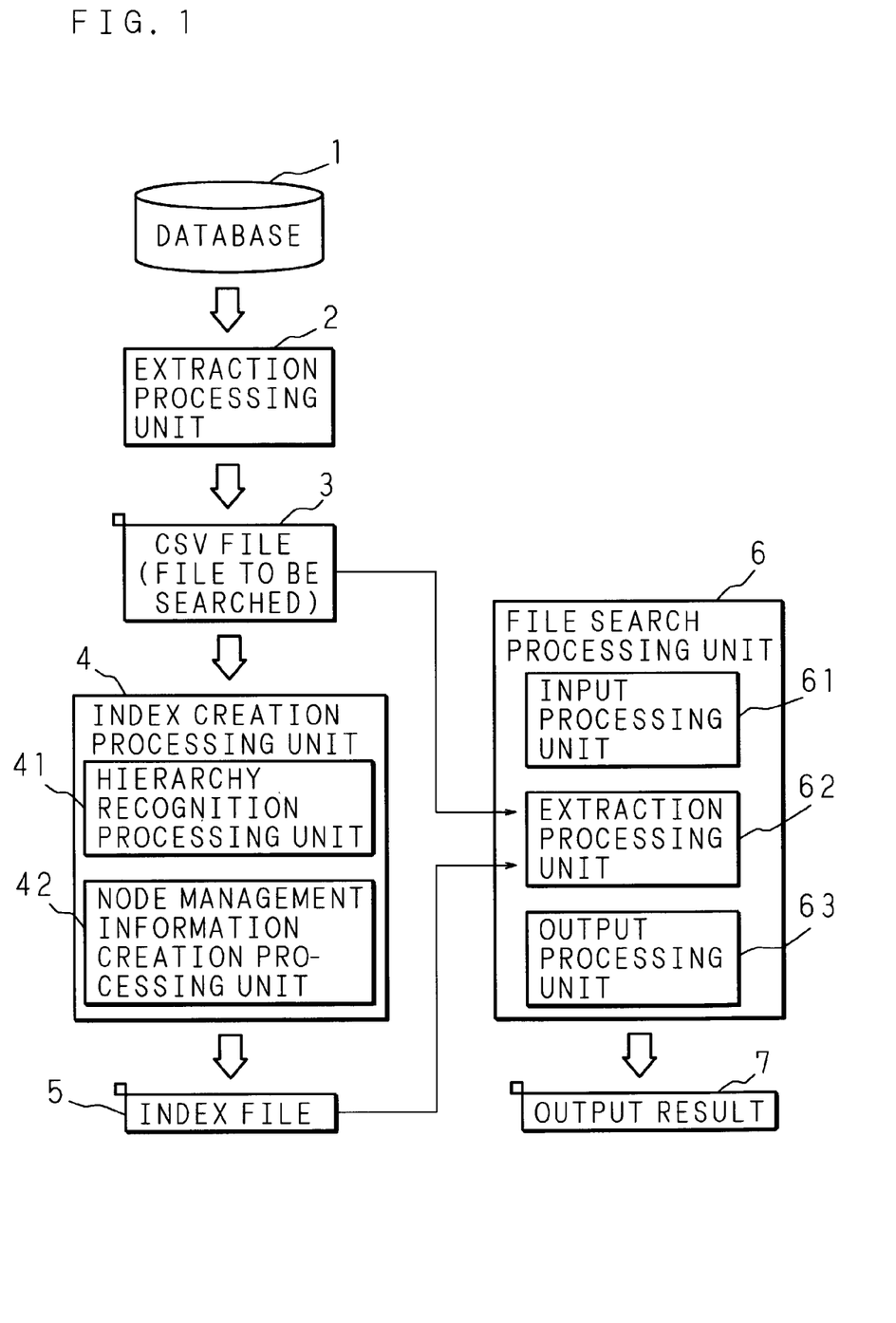
FIG. 1 is a block diagram showing the structure of one embodiment of the present invention.
Figure 2:
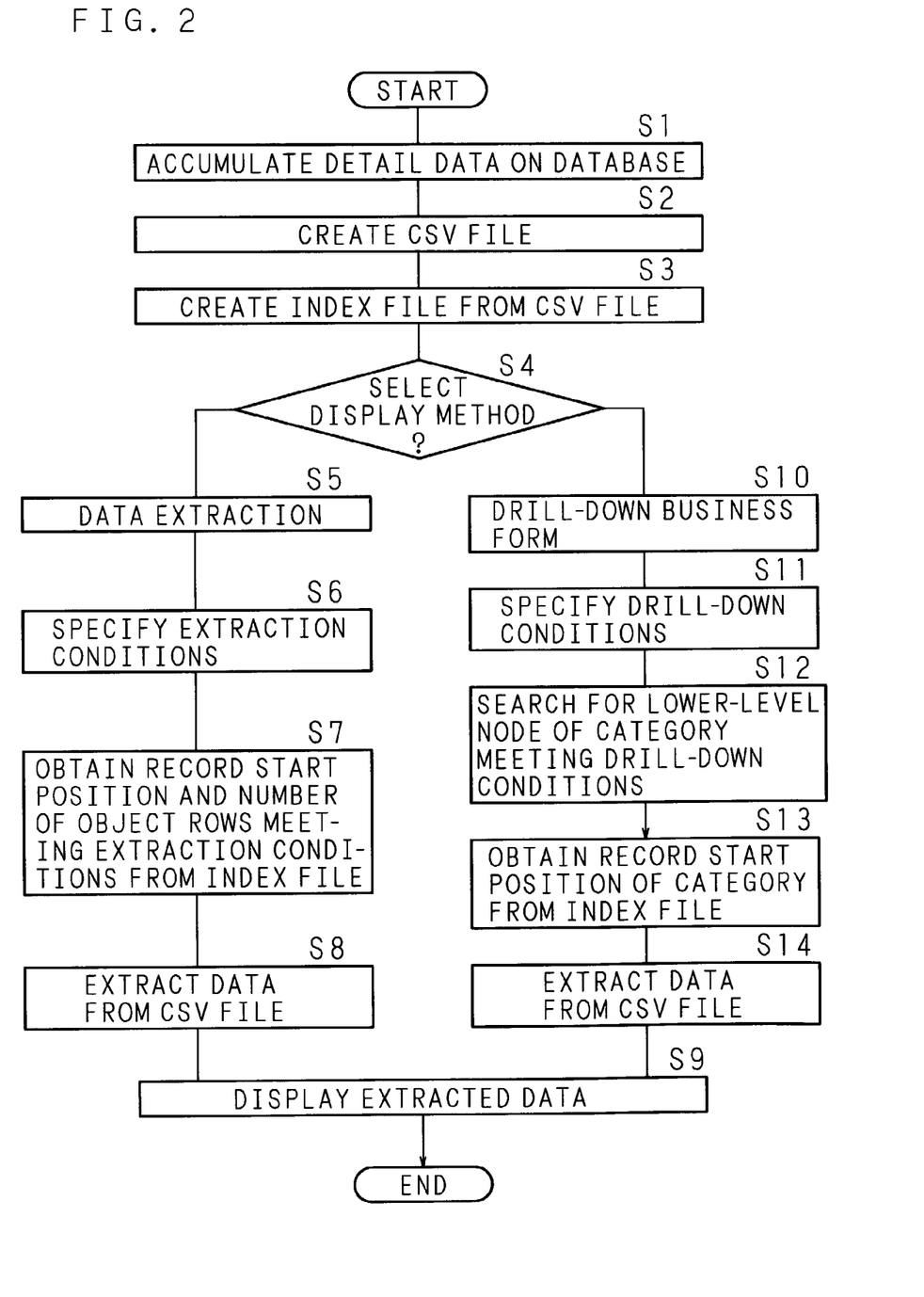
FIG. 2 is a flow chart for explaining the overall process in one embodiment of the present invention.

Using a flow chart of FIG. 2 in addition to FIG. 1, the following description will explain the overall flow of the processes of this embodiment implemented by such structures.

First, the extraction processing unit 2 accumulates detail data on the database 1 (S1 of FIG. 2). The accumulated result is created as a normal CSV file 3 (S2 of FIG. 2). Next, an analysis is performed based on the CSV file 3, and the index creation processing unit 4 creates an index file 5 which is used for searching the CSV file 3 (S3 of FIG. 2). This index file creation process will be explained in detail later using FIG. 5.

In the state where the CSV file 3 and the index file 5 have been created by the above-described processes, when an extraction condition is specified by the user, the file search processing unit 6 extracts data from the CSV file 3, based on the index file 5, and displays the extracted data (S4–S14 of FIG. 2). This data extraction process will also be explained in detail later.

(2) Example of Structure of CSV File and Index File

Figure 3:
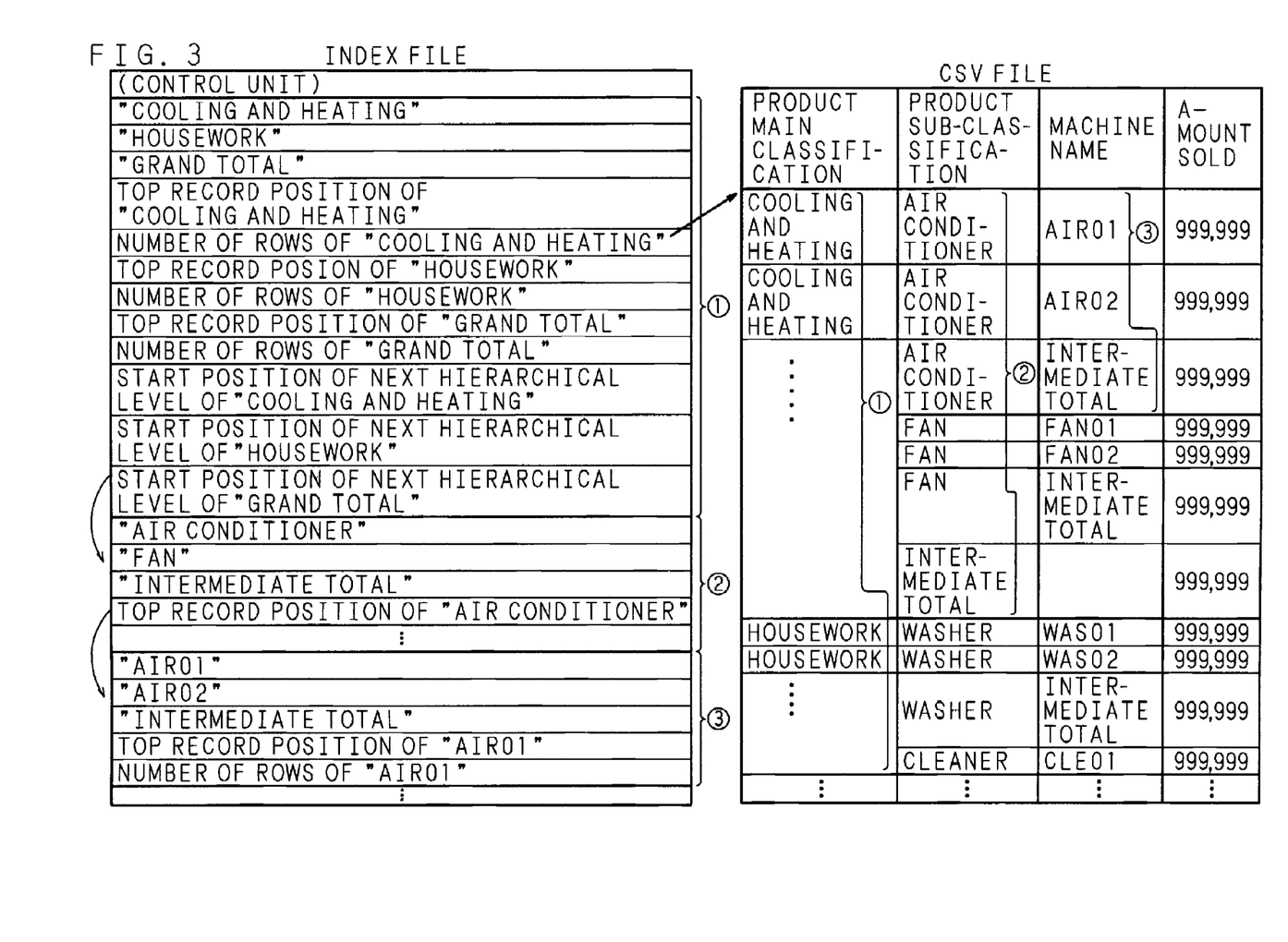
FIG. 3 is a view showing an example of a CSV file and an index file in one embodiment of the present invention.
Figure 4:
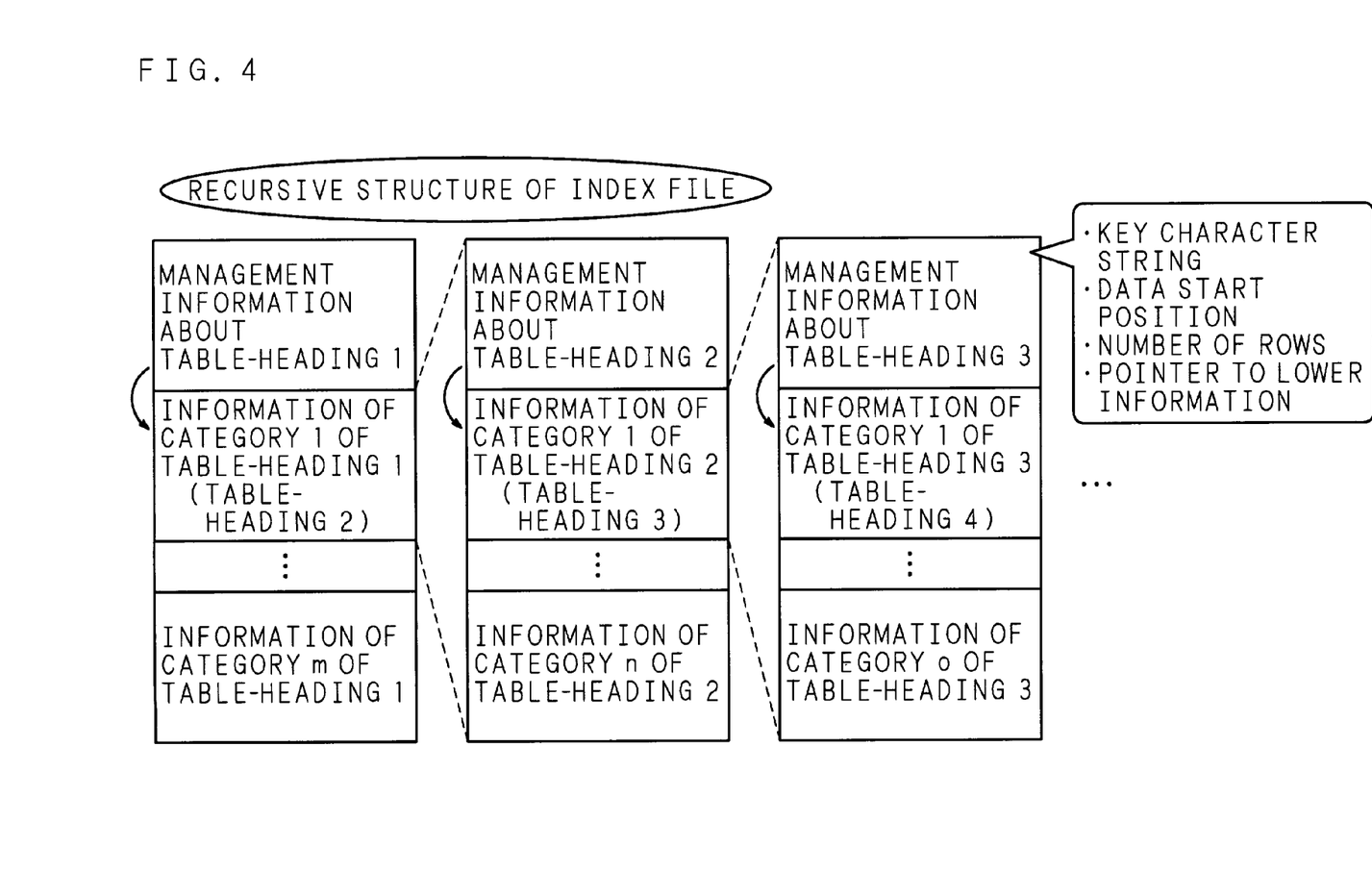
FIG. 4 is a view showing the recursive structure of an index file in one embodiment of the present invention.

FIG. 3 shows an example of the CSV file 3 extracted in this embodiment (the processes of S1 and S2 of FIG. 2) and an example of the index file 5 created by analyzing the CSV file 3 (the process of S3 of FIG. 2). In addition, an example of the recursive structure of the index file is shown in FIG. 4.

In the CSV file 3 (file to be searched) of this embodiment, as shown in FIG. 3, in the first row, the attributes of the fields of subsequent rows (records) are written, and data to be processed is written in the second and subsequent rows. Further, the CSV file 3 has the following data structure. In the fields of each row (record), the first field is the top hierarchical level, and subsequent fields are included in the previous field (forming lower hierarchical levels). In other words, the data structure is a tree structure.

Besides, the index file 5 to be created holds the information about lower-level nodes for each category (key character string) recursively. Each piece of management information is composed of the following information.

A category included in a node (in the example of FIG. 3, "Cooling and Heating" and "Housework").

The top record position and the number of rows about rows (records) including the category on the CSV file 3.

A pointer indicating the start position of the node management information about the category (information about a lower hierarchical level) on the index file 5.

In the example of FIG. 3, since the hierarchical level of Product Main Classification—Product Sub-Classification—Machine Name is present in the table-headings of the CSV file 3, table-heading 1 in FIG. 4 represents Product Main Classification, table-heading 2 represents Product Sub-Classification, and table-heading 3 represents Machine Name. Accordingly, the management information about table-heading 1 is FIG. 3-①, the management information about table-heading 2 is FIG. 3-②, and the management information about table-heading 3 is FIG. 3-③.

Further, referring to the example of FIG. 3, it is shown that the management information about product main classification (FIG. 3-①) includes the categories "Cooling and Heating" and "Housework", and stores the top record position and the number of rows about the rows relating to each of the categories "Cooling and Heating" and "Housework" on the CSV file 3 and a pointer indicating the start position of the next hierarchical level of each of the categories "Cooling and Heating" and "Housework" on the index file 5.

Similarly, as the management information about the category "Cooling and Heating" (FIG. 3-②), it is shown that there are "Air Conditioner" and "Fan" in a lower hierarchical level, and there are stored the top record position and the number of rows about the rows relating to each of the categories "Air Conditioner" and "Fan" on the CSV file 3, and a pointer indicating the start position of the next hierarchical level of each of the categories "Air Conditioner" and "Fan" on the index file 5.

In addition, for the category "Air Conditioner" (FIG. 3-③), it is shown that there are "AIR01" and "AIR02" in a lower hierarchical level, and there are stored the top record position and the number of rows about the category in the lower hierarchical level on the CSV file 3, and a pointer indicating the start position of the lower hierarchical level on the index file 5.

Thus, the index file 5 recursively stores the top record positions, the number of object rows, etc. corresponding to the number of table-headings. In a DBMS, data row information is stored within a data management area for the purpose of search using an index. Whereas, with the technique of this embodiment, the start position of data and the number of object rows are retrieved in advance by analyzing the content data of the CSV file 3 for each category, and are stored as an external file.

(3) Index File Creation Process

The index file 5 is created by storing the information about the top record position and the number of rows on the CSV file 3 in an index file, based on each category in the table-heading of the CSV file 3. This creation process will be explained using the flow chart of FIG. 5, the explanatory view of the management structure of FIG. 6 and the explanatory view of the break determination process of FIG. 7.

Figure 5:
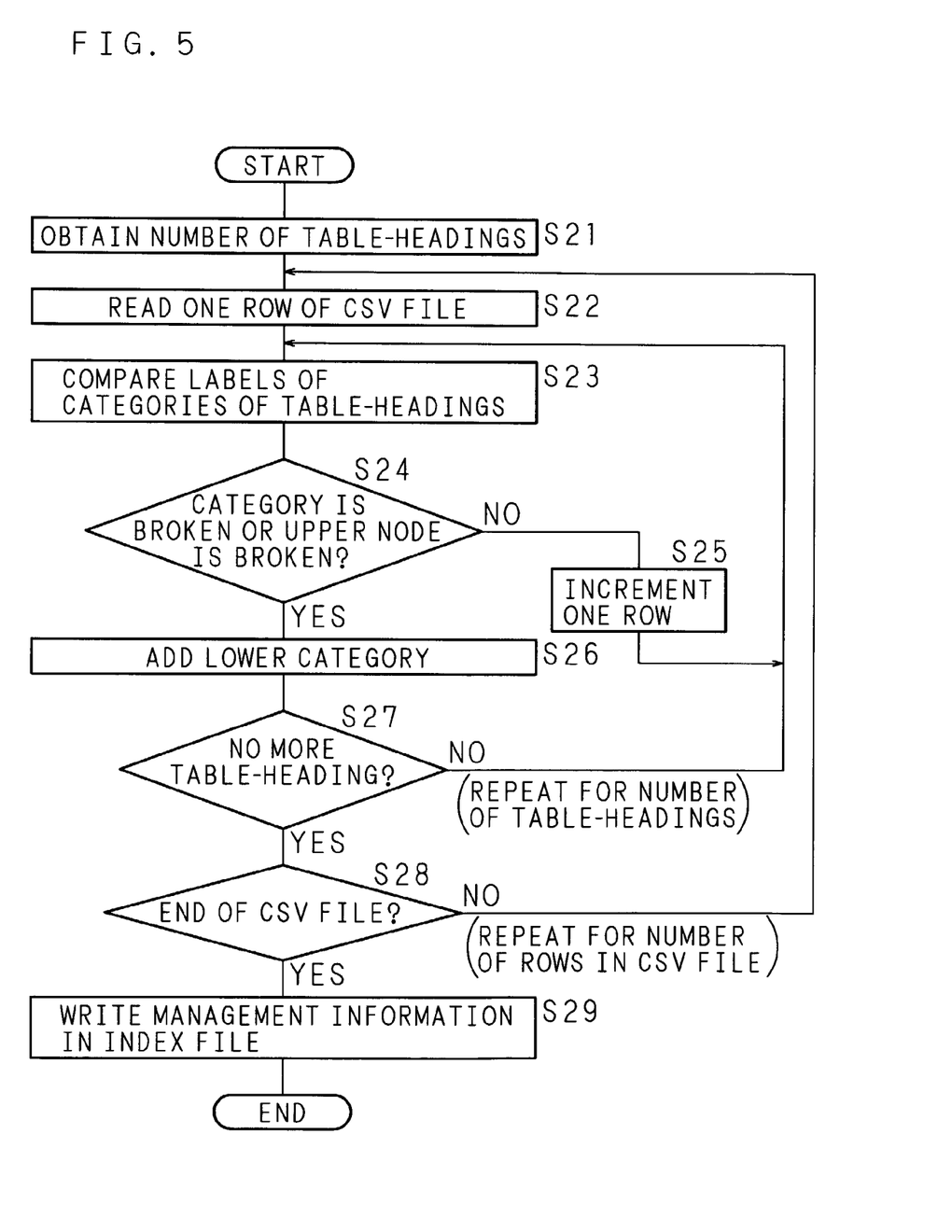
FIG. 5 is a flow chart showing an index file creation process in one embodiment of the present invention.

First, the number of table-headings of the CSV file 3 (file to be searched), which is to be the first entry, is obtained (S21 of FIG. 5). This number of table-headings is supplied as an input parameter together with the CSV file 3 from the user to the processing program when creating an index. In the example of FIG. 4, the number of table-headings is three as there are Product Main Classification—Product Sub-Classification—Machine Name.

Figure 6:
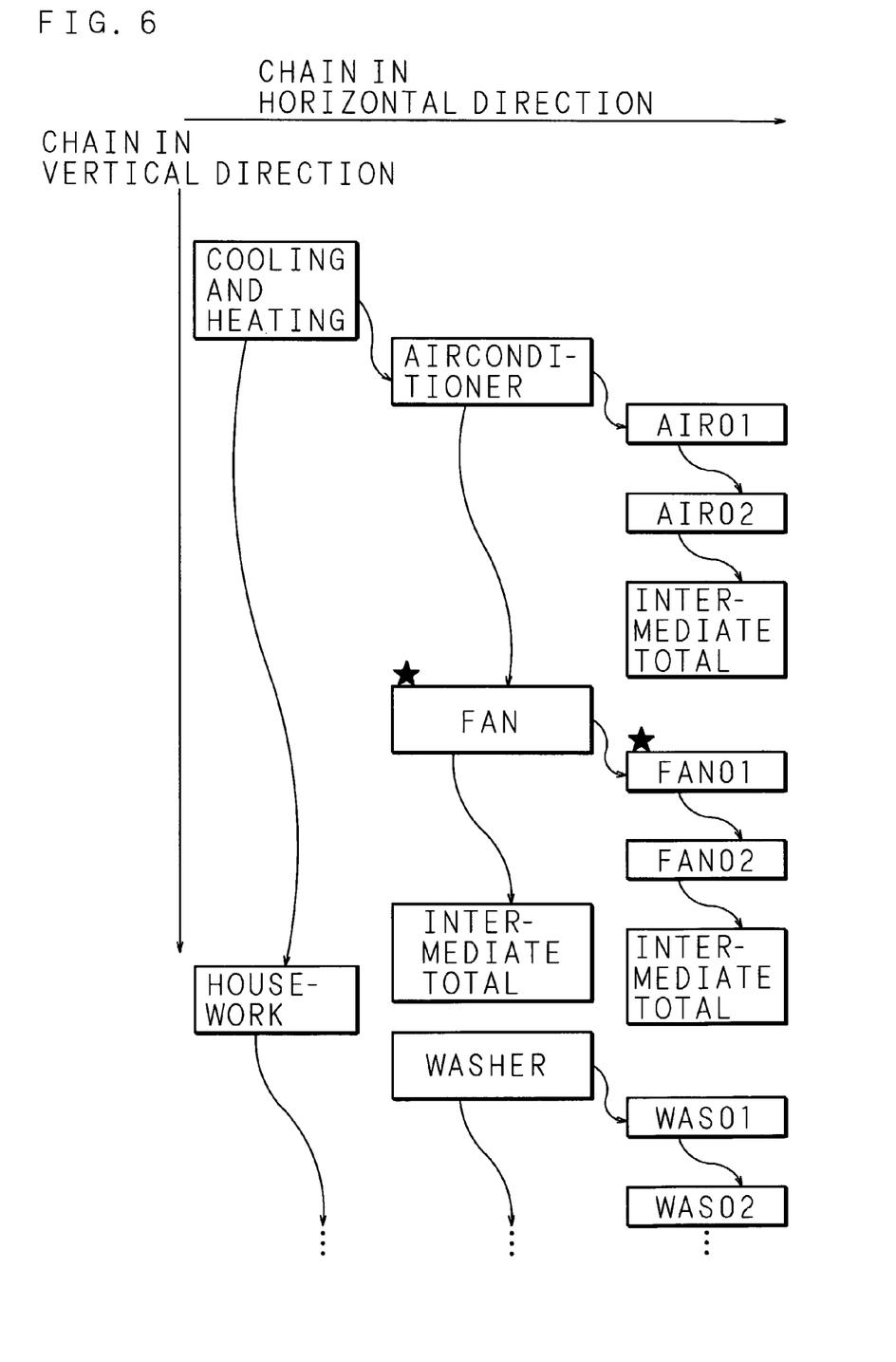
FIG. 6 is a view showing the management structure using an index file in one embodiment of the present invention.

Next, one row of the CSV file 3 is read (S22 of FIG. 5). At this time, the top record position (displacement from the top of the CSV file 3) has already been obtained for each category. By the reading of the first row, a management structure chained to Cooling and Heating—Air Conditioner—AIR01 in a horizontal direction is generated (FIG. 6).

From the second row, the labels of the categories are compared sequentially by reading the CSV file 3 (S23 of FIG. 5). As the comparison method, a determination is made as to whether the category is broken (which means a change of category) from a higher-level table-heading sequentially (S24 of FIG. 5). When the category is not broken, since the corresponding node is the same as that of the previous row, the number of rows is incremented by one (S25 of FIG. 5).

When the category is broken, a chain is added in a vertical direction. At this time, if a higher-level node than the corresponding node is broken, it is determined that the category is broken, and a lower category is added (S26 of FIG. 5).

After processing, a determination is made as to whether there is no more table-heading, i.e., whether the processing has been repeated for the number of nodes corresponding to the inputted number of table-headings (in the case of FIG. 3, whether the processing is repeated for three nodes) (S27 of FIG. 5). When the processing has not been repeated for the number of table-headings, the processing is repeated to compare the category label of a lower-level node.

Figure 7:
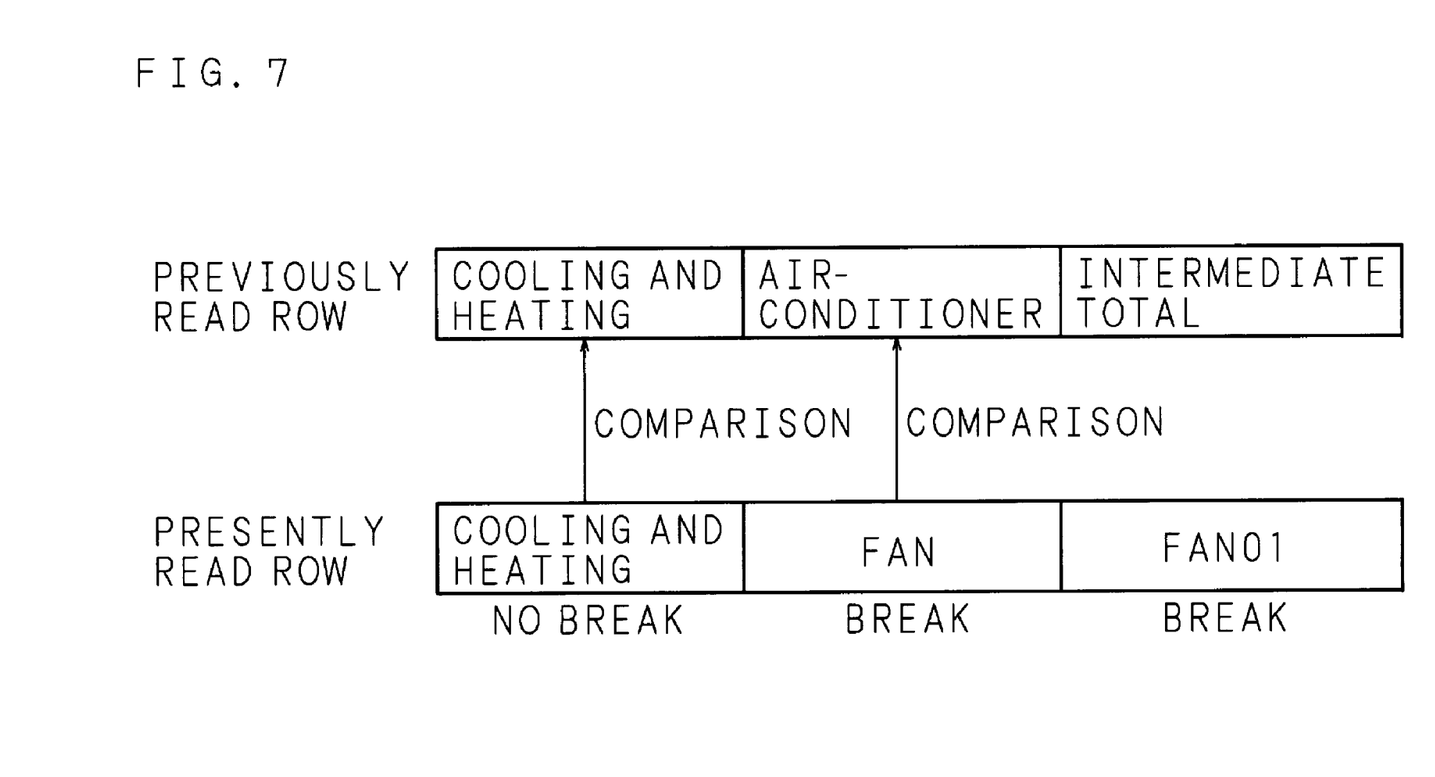
FIG. 7 is a view showing an example of determination of break in one embodiment of the present invention.

After making the comparisons for the nodes of the table-headings, a determination is made as to whether the CSV file 3 has come to an end (S28 of FIG. 5). When the CSV file 3 has not come to an end, the process of reading the next row is repeated for the number of rows in the CSV file 3. For example, as shown in FIG. 7, if the previously read table categories in the CSV file 3 are "Cooling and Heating"—"Air Conditioner"—"Intermediate Total" and the row read in this case included "Cooling and Heating"—"Fan"—"FAN01", the respective categories are compared sequentially for the number of table-headings.

As a result, since the product main classification is not broken, the number of rows is incremented by one. Then, since the product sub-classification is broken, a chain of Fan is added in a vertical direction from Air Conditioner. Moreover, since there is a break in Fan, a chain of FAN01 is added in a horizontal direction from Fan (when a higher-level node is broken, the lower-level is also broken) (part indicted with ★ in FIG. 6). By repeating this processing, the relationship of nodes and the number of rows in the table-heading categories are all expanded on the memory. Finally, the management information about these items is written in a file as the index file 5 (S29 of FIG. 5).

More specifically, with the top hierarchical level as an origin, the categories "Cooling and Heating" and "Housework" recognized as of this hierarchical level are recorded as the titles of categories included in the management information of table-heading 1, subsequently the top record position and the number of rows on the CSV file 3 are recorded for each of "Cooling and Heating" and "Housework", and finally a pointer indicating a start position on the index file 5 is recorded for management information about a lower hierarchical level included in each of the categories "Cooling and Heating" and "Housework" (FIG. 3-①).

Thereafter, by sequentially recording the titles of categories for each hierarchical level, the top record position and the number of rows of each of the categories on the CSV file 3 and a pointer indicating the start position of management information about a lower hierarchical level included in each of the categories on the index file 5 in the same manner, the management information is created.

(4) Process of Extracting Data from CSV File Using Index File

Referring to the flow chart of FIG. 2, the following description will explain a process of extracting data from the CSV file 3 using the index file 5.

First, the end user selects a display method (S4 of FIG. 2). This means to select either the display of data extraction shown in FIG. 8A (S5–S8 of FIG. 2) or the display of drill-down business form shown in FIG. 8B (S10–S14 of FIG. 2).

Figure 8A:
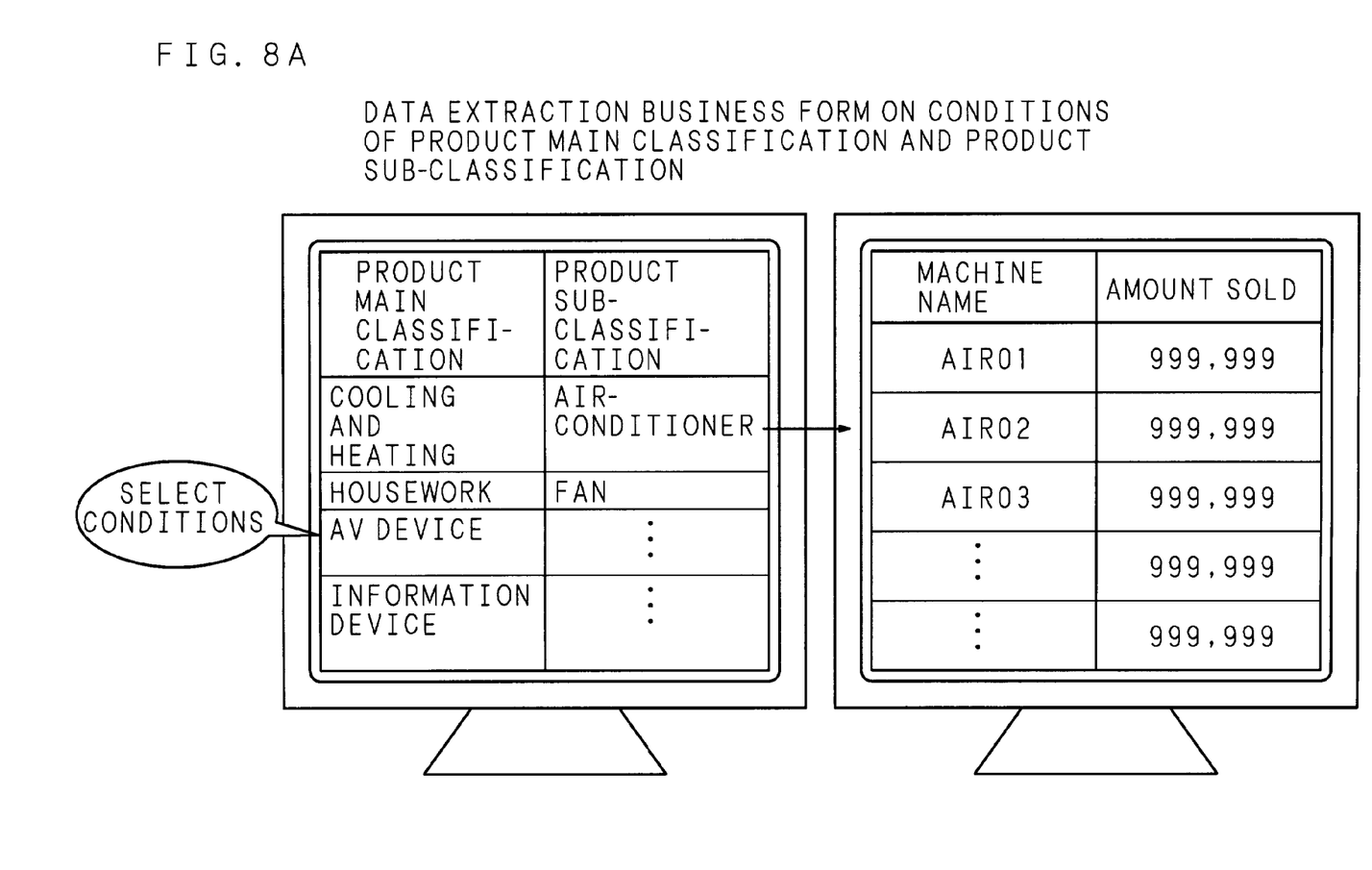
FIGS. 8A and 8B are views showing examples of output display in one embodiment of the present invention.

When the data extraction process is selected (S5 of FIG. 2), subsequently extraction conditions are specified (S6 of FIG. 2). The extraction conditions are, for example, conditions such as Product Main Classification="Cooling and Heating", and Product Sub-Classification="Air Conditioner". The record start position and the number of object rows on the CSV file 3 that meet these extraction conditions are obtained from the index file 5 (S7 of FIG. 2). Since the index file 5 has a recursive structure, it is possible to directly retrieve the record start position and the number of object rows, based on the extraction conditions. Based on the record start position and the number of object rows, display data is extracted from the CSV file 3 (S8 of FIG. 2). The extraction itself is performed by opening, reading and closing the file in a usual fashion. The extracted data is composed of several rows, and displayed on the screen on which the end user utilizes the information (S9 of FIG. 2). Although the extraction and display of data are repeated by the end user, it is possible to immediately extract data that the end user wishes to display from the CSV file 3 by using the index file 5 of the present invention. An example of the output result displayed in such a manner is shown in FIG. 8A.

On the other hand, when the output of drill-down business form is selected (S10 of FIG. 2), drill-down conditions are specified by entry (S11 of FIG. 2). A lower-level node of category that meets the drill-down conditions is searched (S12 of FIG. 2), the record start position of the category is obtained from the index file 5 (S13 of FIG. 2), and then data is extracted from the CSV file 3 (S14 of FIG. 2). This is repeated for the number of categories specified.

Figure 8B:
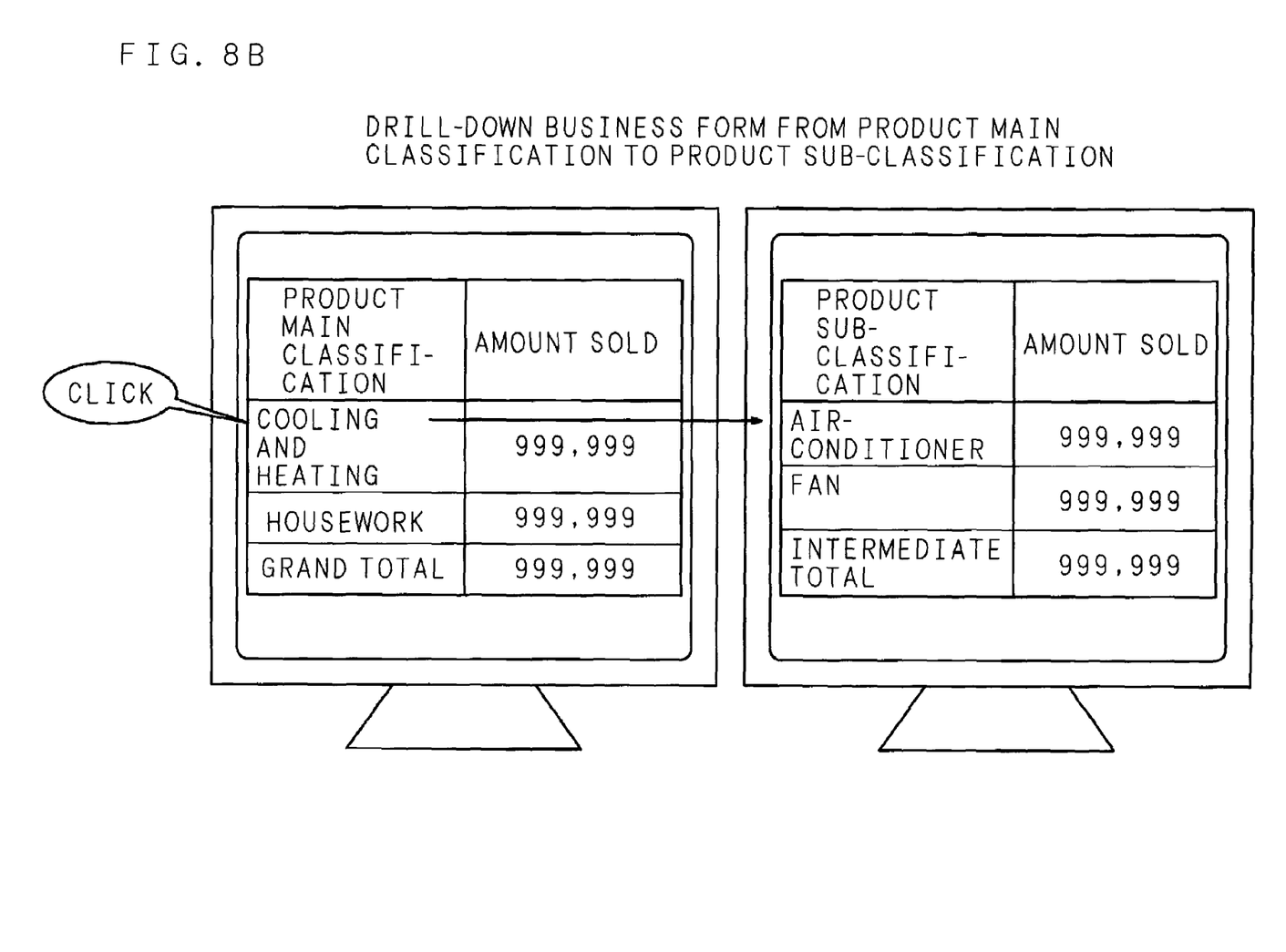

For example, when the category "Cooling and Heating" is clicked, as shown in FIG. 3, since the category (key character string) "Cooling and Heating" exists in the top hierarchical level "Product Main Classification", the start position of data of a lower hierarchical level than the category "Cooling and Heating" is recognized, and the management information about the node relating to "Cooling and Heating" is read. Since "Air Conditioner" and "Fan" exist in the management information, the top record positions relating to these categories on the CSV file 3 are retrieved, and data is extracted based on the top record positions. In this example, since a setting is made to extract a record of a category to be an intermediate total, the information about "Air Conditioner", "Fan" and "Intermediate Total" in a lower hierarchical level with respect to "Cooling and Heating" is displayed (FIG. 8B).

Figure 9:
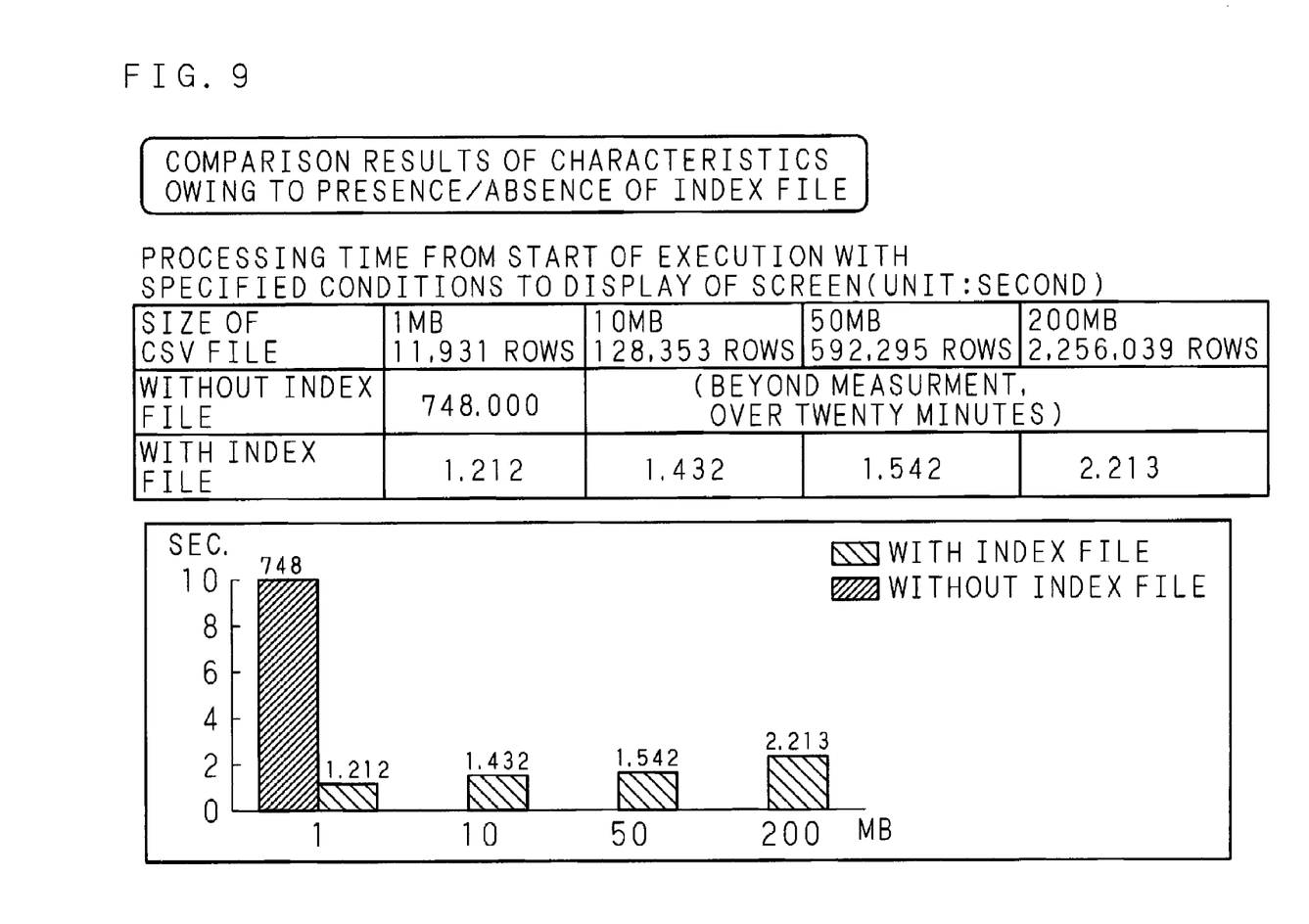
FIG. 9 is a view showing the effects of the present invention.

As described above, according to the present invention, by employing the index file 5, it is possible to significantly increase the speed of data extraction from the large-size CSV file 3. An example of this advantageous effect is shown in FIG. 9.

Besides, in addition to data extraction, it is also possible to apply the index file 5 to other use as a drilling function.

Moreover, since the index file 5 is a separate file independent of the CSV file 3, it has no influence on the original CSV file 3. Unlike a conventional database in which data and an index are united, the CSV file 3 to be the input origin is open.

Furthermore, the openness of the CSV file 3 to be the input data can be increased by externally providing the index file 5, and also a system which is updated highly frequently and required to display data immediately, such as a business information support system, can immediately utilize data because there is no need to store the data in the system itself.

As this invention may be implemented in several forms without departing from the spirit of essential characteristics thereof, this embodiment is therefore illustrative and not restrictive, since the scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A file search method for searching a file to be searched, said file to be searched including records having fields allocated to each of a plurality of hierarchical levels and being constructed so that records having a same key character string in a field at a same hierarchical level are arranged in series, comprising:

creating an index file containing management information for each of nodes in a tree structure obtained by classifying the records in said file to be searched by using a plurality of hierarchical levels, the management information including a title of a key character string contained in each node, a pointer indicating a record position of node management information of a lower hierarchical level, and start position information and number information about records having a field with the key character string on said file to be searched;

accepting an instruction to search for data relating to a specified key character string over said file to be searched;

retrieving from said index file the start position information and the number information about records relating to the specified key character string on said file to be searched;

extracting from said file to be searched a number of records specified by the number information from a position specified by the start position information; and outputting data of the extracted records.

2. The file search method of claim 1, wherein the file to be searched contains unstructured data.

3. A file search method for searching a file to be searched, said file to be searched including records having fields allocated to each of a plurality of hierarchical levels and being constructed so that records having a same key character string in a field at a same hierarchical level are arranged in series, comprising:

creating an index file containing management information for each of nodes in a tree structure obtained by classifying the records in said file to be searched by using a plurality of hierarchical levels, the management information including a title of a key character string contained in each node, start position information and number information about records having a field with the key character string on said file to be searched, and a pointer indicating a position of node management information of a lower hierarchical level provided for each key character string;

accepting an instruction to search for data relating to a specified key character string over said file to be searched;

retrieving, based on the pointer to the node management information of a lower hierarchical level relating to the specified key character string, a start position of a record of the node management information of the lower hierarchical level from said index file;

extracting data of a record in said file to be searched, based on the retrieved start position of record; and outputting the extracted data.

4. The file search method of claim 3, wherein the file to be searched contains unstructured data.

5. A file search apparatus for searching a file to be searched, said file to be searched including records having fields allocated to each of a plurality of hierarchical levels and being constructed so that records having a same key character string in a field at a same hierarchical level are arranged in series, comprising:

an index file containing management information for each of nodes in a tree structure obtained by classifying the records in said file to be searched by using a plurality of hierarchical levels, the management information including a title of a key character string contained in each node, a pointer indicating a record position of node management information of a lower hierarchical level, and start position information and number information about records having a field with the key character string on said file to be searched;

an input unit for giving an instruction to search for data relating to a specified key character string over said file to be searched;

a retrieving unit for retrieving from said index file the start position information and the number information about records relating to the specified key character string on said file to be searched;

an extracting unit for extracting from said file to be searched a number of records specified by the number information from a position specified by the start position information; and an output unit for outputting data of the extracted records.

6. The file search apparatus of claim 5, wherein the file to be searched contains unstructured data.

7. A file search apparatus for searching a file to be searched, said file to be searched including records having fields allocated to each of a plurality of hierarchical levels and being constructed so that records having a same key character string in a field at a same hierarchical level are arranged in series, comprising:

an index file containing management information for each of nodes in a tree structure obtained by classifying the records in said file to be searched by using a plurality of hierarchical levels, the management information including a title of a key character string contained in each node, start position information and number information about records having a field with the key character string on said file to be searched, and a pointer indicating a position of node management information of a lower hierarchical level provided for each key character string;

an input unit for giving an instruction to search for data relating to a specified key character string over said file to be searched;

a retrieving unit for retrieving, based on the pointer to the node management information of a lower hierarchical level relating to the specified key character string, a start position of a record of the node management information of the lower hierarchical level from said index file;

an extracting unit for extracting data of the record in said file to be searched, based on the retrieved start position of record; and an output unit for outputting the extracted data.

8. The file search apparatus of claim 7, wherein the file to be searched contains unstructured data.

9. An index file creation method for creating an index file for searching a file to be searched, said file to be searched including records having a key character string allocated to each of a plurality of hierarchical levels and being constructed so that records having a same key character string in a field at a same hierarchical level are arranged in series, said index file containing management information for each of nodes in a tree structure obtained by classifying the records in said file to be searched by using a plurality of hierarchical levels, the management information including a title of a key character string contained in each node, a pointer indicating a record position of the node management information of a lower hierarchical level, and start position information and number information about records having the key character string on said file to be searched, said method comprising:

recognizing a number of hierarchical levels; and executing, for nodes of all of the recognized number of hierarchical levels, a node management information creation process to create node management information which is provided for each node, said process including obtaining a position of a top record among records containing a key character string included in the hierarchical level of each node on said file to be searched, detecting the number of records having the same key character string as in the top record by reading records following the top record, and writing information about the top record position and information about the number of the records in the node management information.

10. The index file creation method of claim 9, wherein the file to be searched contains unstructured data.

11. An index file creation device for creating an index file for searching a file to be searched, said file to be searched including records having a key character string allocated to each of a plurality of hierarchical levels and being constructed so that records having a same key character string in a field at a same hierarchical level are arranged in series, said index file containing management information for each of nodes in a tree structure obtained by classifying the records in said file to be searched by using a plurality of hierarchical levels, the management information including a title of a key character string contained in each node, a pointer indicating a record position of the node management information of a lower hierarchical level, and start position information and number information about records having the key character string on said file to be searched, said device comprising:

a hierarchical number recognizing unit for recognizing number of hierarchical levels; and a node management information creating unit for executing, for nodes of all of the number of hierarchical levels recognized by said hierarchical number recognizing unit, a node management information creation process to create node management information which is provided for each node, said process including obtaining a position of a top record among records containing a key character string included in the hierarchical level of each node on said file to be searched, detecting the number of records having the same key character string as in the top record by reading records following the top record, and writing information about the top record position and information about the number of the records in the mode management information.

12. The index file creation device of claim 11, wherein the file to be searched contains unstructured data.

13. A computer readable memory product for instructing a computer to search a file to be searched which includes records having fields allocated to each of a plurality of hierarchical levels and is constructed so that records having a same key character string in a field at a same hierarchical level are arranged in series, by using an index file containing management information for each of nodes in a tree structure obtained by classifying the records in said file to be searched by using a plurality of hierarchical levels, the management information including a title of a key character string contained in each node, a pointer indicating a record position of the node management information of a lower hierarchical level and start position information and number information about records having a field with the key character string on said file to be searched, said memory product storing a program to instruct a computer to:

accept an instruction to search for data relating to a specified key character string over said file to be searched;

retrieve from said index file the start position information and the number information about records relating to the specified key character string on said file to be searched;

extract from said file to be searched a number of records specified by the number information from a position specified by the start position information; and     output data of the extracted records.

14. The computer readable memory product of claim 13, wherein the file to be searched contains unstructured data.

15. A computer readable memory product for instructing a computer to search a file to be searched which includes records having fields allocated to each of a plurality of hierarchical levels and is constructed so that records having a same key character string in a field at a same hierarchical level are arranged in series, by using an index file containing management information for each of nodes in a tree structure obtained by classifying the records in said file to be searched by using a plurality of hierarchical levels, the management information including a title of a key character string contained in each node, start position information and number information about records having a field with the key character string on said file to be searched, and a pointer indicating a position of node management information of a lower hierarchical level provided for each character string, said memory product storing a program to instruct a computer to:

accept an instruction to search for data relating to a specified key character string over said file to be searched;

retrieve, based on the pointer to the node management information of a lower hierarchical level relating to the specified key character string, a start position of a record of the node management information of the lower hierarchical level from said index file;

extract data of a record in said file to be searched, based on the retrieved start position of record; and     output the extracted data.

16. The computer readable memory product of claim 15, wherein the file to be searched contains unstructured data.

17. A computer readable memory product for instructing a computer to create an index file for searching a file to be searched which includes records having a key character string allocated to each of a plurality of hierarchical levels and is constructed so that records having a same key character string in a field at a same hierarchical level are arranged in series, said index file containing management information for each of nodes in a tree structure obtained by classifying the records in said file to be searched by using a plurality of hierarchical levels, the management information including a title of a key character string contained in each node, a pointer indicating a record position of the node management information of a lower hierarchical level, and start position information and number information about records having the key character string on said file to be searched, said memory product storing a program to instruct a computer to:

recognize number of hierarchical levels; and execute, for nodes of all of the recognized number of hierarchical levels, a node management information creation process to create node management information which is provided for each node, said process including obtaining a position of a top record among records containing a key character string included in the hierarchical level of each node on said file to be searched, detecting the number of records having the same key character string as in the top record by reading records following the top record, and writing information about the top record position and information about the number of the records in the node management information.

18. The computer readable memory product of claim 17, wherein the file to be searched contains unstructured data.

* * * * *

UNITED STATES PATENT AND TRADEMARK OFFICE
CERTIFICATE OF CORRECTION

| | | |
|---|---|---|
| PATENT NO. | : 7,143,086 B2 | Page 1 of 1 |
| APPLICATION NO. | : 10/301635 | |
| DATED | : November 28, 2006 | |
| INVENTOR(S) | : Kenichiro Miyamoto et al. | |

It is certified that error appears in the above-identified patent and that said Letters Patent is hereby corrected as shown below:

Column 10, Line 53, change "mode" to --node--.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,143,086 B2 |
| APPLICATION NO. | : 10/301635 |
| DATED | : November 28, 2006 |
| INVENTOR(S) | : Kenichiro Miyamoto et al. |

It is certified that error appears in the above-identified patent and that said Letters Patent is hereby corrected as shown below:

Column 10, Line 53, change "mode" to --node--.

Signed and Sealed this

Twenty-first Day of August, 2007

JON W. DUDAS
*Director of the United States Patent and Trademark Office*